UNITED STATES PATENT OFFICE.

JOHN WINFIELD WOOD, OF MOULTON, IOWA.

ELECTROCHEMICAL PROCESS FOR PRODUCING NITROGEN COMPOUNDS.

1,118,993. Specification of Letters Patent. Patented Dec. 1, 1914.

No Drawing. Application filed February 11, 1913. Serial No. 747,743.

*To all whom it may concern:*

Be it known that I, JOHN WINFIELD WOOD, a citizen of the United States, and a resident of Moulton, in the county of Appanoose and State of Iowa, have invented a new and Improved Electrochemical Process for Producing Nitrogen Compounds, of which the following is a full, clear, and exact description.

The object of the process is the utilization of air nitrogen to form compounds of nitrogen, and this invention is an improvement on my Patent No. 826,301.

The formation of nitrogen compounds is obtained by moist soil electrolyte, which is aerated and maintained moist during the action of the current. In the description of this process, by the moist soil is understood the saturated condition of the soil; that is, the soil contains 100% of moisture and air.

For the preparation of the nitrogen compounds in my process I employ a vat of suitable capacity, provided with electrodes of large electric capacity, capable of carrying a large excess of current needed for the electrolytic action at maximum resistance. The moist soil is banked about the electrodes and is then diminished in volume toward the mid-point between the electrodes, so that the resistance to the current by the moist soil is substantially uniform between the electrodes. The current passed through the soil will then decompose the moisture with which the soil is saturated into hydrogen and oxygen. The air present in the water, soil, and also the air forced through the moist soil in the vat, when coming into contact with the nascent hydrogen and oxygen, will form nitric acid at the positive electrode and ammonium hydroxid at the negative electrode, and probably some ammonium nitrate intermediate the electrodes. All of these ammonium compounds will be dissolved by the moisture present. It is known that in presence of bases and of porous materials to favor oxidation ammonium is capable of suffering further oxidation and conversion into nitric acid which acts upon the base present to form a nitrate; for example:—

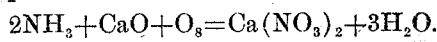
$$2NH_3 + CaO + O_8 = Ca(NO_3)_2 + 3H_2O.$$

In consequence of this the soil I prefer to use is one containing alkali metals and alkaline earth metals, separate or together, diffused in the soil. Due to the formation of nitric acid, ammonium hydrate, and other compounds of nitrogen, the alkali and alkaline earth metals present as carbonates, oxids, or other compounds will be transformed into nitrogen compounds of a simple or complicated origin; all of the nitrogen compounds being soluble in the water will be dissolved by the moisture in the soil. To maintain the soil at the saturation point water is added to it intermittently or continuously, and this addition of the water will necessarily dissolve and leach out the nitrogen compound formed, and also other compounds of complicated nature containing nitrogen. The water added to the soil may be either admitted as a spray so as to dissolve a large quantity of air before dropping on to the soil in the vat, or it can be supplied by means of capillary action from the lower portion of the soil. The air can be forced through the moist soil by means of a pump from the base of the vat, forcing it to rise to the top, and, consequently, it will be forced to come in contact with the traveling ions in the electrolytes. The amount of air and moisture will necessarily vary with the temperature at which the electrochemical action takes place. It will be remarked that the moisture in the ground is so divided as to form a thin film around the particles constituting the soil, and the diffusion of the nitrates formed will be substantially uniform. Due to this particular diffusion of the water in the soil the current will be carried over substantially the entire surface of the particles present in the soil, thus exposing a great surface of action, and also a great surface of contact with the air forced through the soil. The nitrogen compounds so formed will have a large contacting surface for acting with the alkali metals and alkaline earth metals diffused in the ground and partially dissolved by the moisture in the soil.

The soil in the vat may be treated by the electric current until the same is completely saturated with the nitrogen compounds, then removed and the nitrogen compound leached out by means of water. The soil can then be again enriched with alkali metals and alkaline earth metals and treated over again by means of the current. Similarly, the nitrogen compounds formed in the soil may be leached out during the action of the current by adding an excess of the water to the soil in the vat and continuously draining off the nitrogen compound dissolved by the excess of the water. To maintain constant the formation of the nitrogen compound in the soil addition of alkali metals and alkaline earth metals is made, intermittently or continuously, to the soil in the vat, preferably in the form of a solution.

The soil saturated with the nitrogen compounds can be used directly as a fertilizer, if desired, without leaching out the nitrogen compounds from the soil. This will be advantageous when the enriched soil is used on the premises, and the so enriched soil can be diffused on the ground to be fertilized.

Having thus described my invention, what I claim as new and desire to secure by Letters Patent is:—

1. An electrochemical process for manufacturing nitrogen compounds, which consists in subjecting a moist soil to an electric current, forcing air through said soil while under the action of the current, and maintaining said soil moist during the flow of current through said soil.

2. An electrochemical process for manufacturing nitrogen compounds, which consists in subjecting a moist soil containing alkali metals to an electric current, forcing air through said soil while under the action of the current, and maintaining said soil moist during the flow of current through said soil.

3. An electrochemical process for manufacturing nitrogen compounds, which consists in subjecting a moist soil containing alkaline earth metals to an electric current, forcing air through said soil while under the action of the current, and maintaining said soil moist during the flow of current through said soil.

4. An electrochemical process for manufacturing nitrogen compounds, which consists in subjecting a moist soil containing alkali metals and alkaline earth metals to an electric current, forcing air through said soil under the action of the current, and maintaining said soil moist during the flow of current through said soil.

5. An electrochemical process for manufacturing nitrogen compounds, which consists in subjecting a moist soil to an electric current, forcing air through said soil from the lower surface of the same when the soil is under the action of the current, and maintaining said soil moist during the flow of current through said soil.

6. An electrochemical process for manufacturing nitrogen compounds, which consists in subjecting a moist soil to an electric current, forcing air through said soil while under the action of the current, and adding water to said soil continuously during the flow of current through said soil.

7. An electrochemical process for manufacturing nitrogen compounds, which consists in subjecting a moist soil to an electric current, forcing air through said soil while under the action of the current, and adding water to said soil during the flow of current through said soil.

8. The electrochemical process for manufacturing nitrogen compounds which consists in subjecting a moist soil containing alkali metals and alkaline earth metals to an electric current, forcing air intermittently through said soil while the soil is subjected to the current, maintaining said soil moist during the flow of the current, and adding intermittently to said soil alkali metals and alkaline earth metals.

9. The electrochemical process for manufacturing nitrogen compounds which consists in subjecting a moist soil containing alkali metals and alkaline earth metals to an electric current, forcing air intermittently through the said soil while the soil is subjected to the current, maintaining said soil moist during the flow of current by adding an excess of water, draining off the excess of water which dissolves the nitrogen compounds in the soil, and adding to the soil a solution containing alkali metals and alkaline earth metals.

10. An electrochemical process for manufacturing nitrogen compounds, which consists in subjecting a moist soil to an electric current, forcing air through said soil while under the action of the current, adding water to said soil during the flow of current through said soil, and leaching out from the soil the nitrogen compounds.

11. The electrochemical process for manufacturing nitrogen compounds which consists in subjecting a moist soil to an electric current and forcing air through said soil while under the action of the current.

In testimony whereof I have signed my name to this specification in the presence of two subscribing witnesses.

JOHN WINFIELD WOOD.

Witnesses:
S. J. C. ELEY,
I. M. ANDREWS.